April 7, 1953  J. C. GUIMBAL  2,634,375
COMBINED TURBINE AND GENERATOR UNIT
Filed Nov. 3, 1950  3 Sheets-Sheet 1
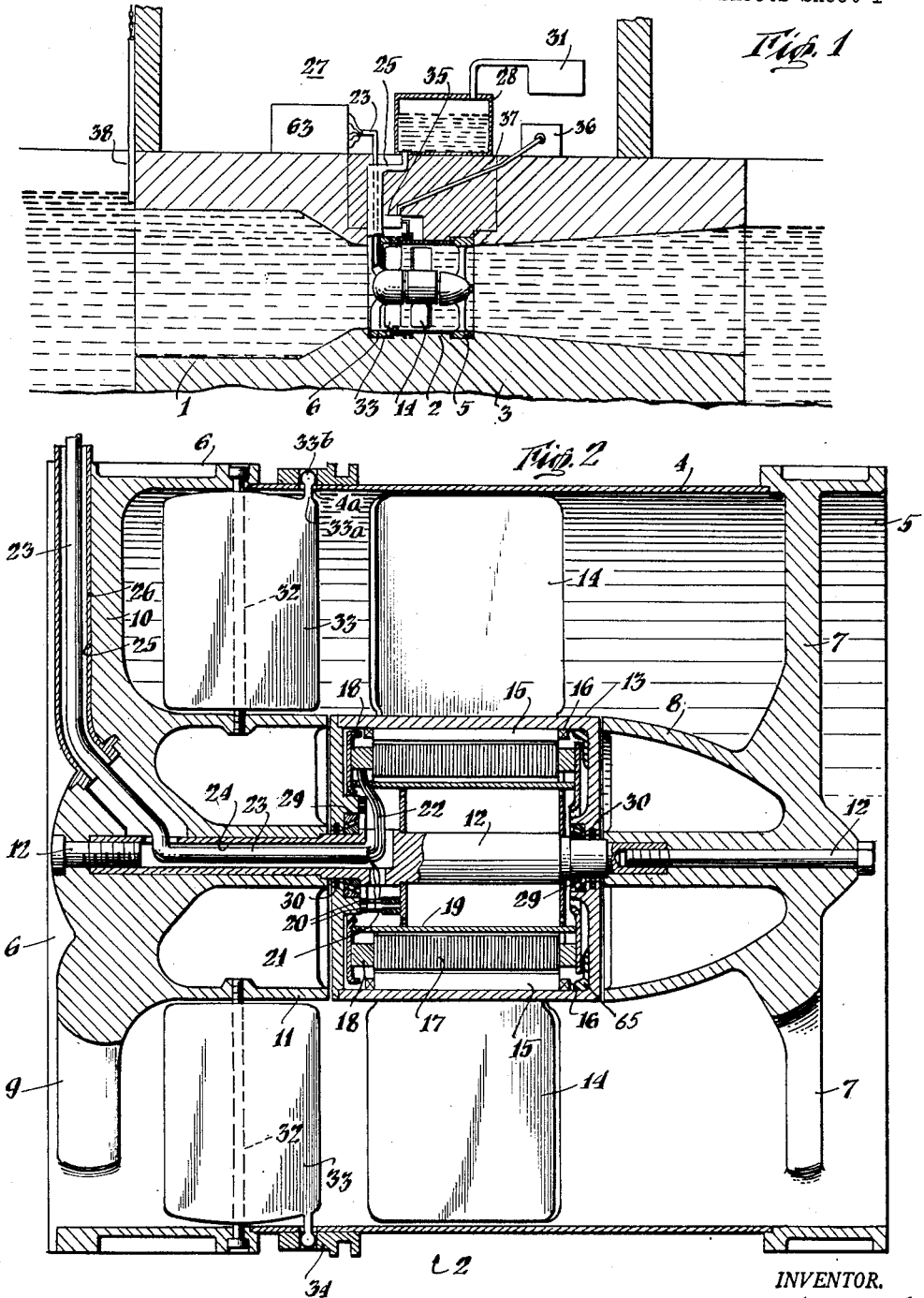
INVENTOR.
Jean-Claude Guimbal
BY George H Corey
ATTORNEY April 7, 1953   J. C. GUIMBAL   2,634,375
COMBINED TURBINE AND GENERATOR UNIT
Filed Nov. 3, 1950   3 Sheets-Sheet 2
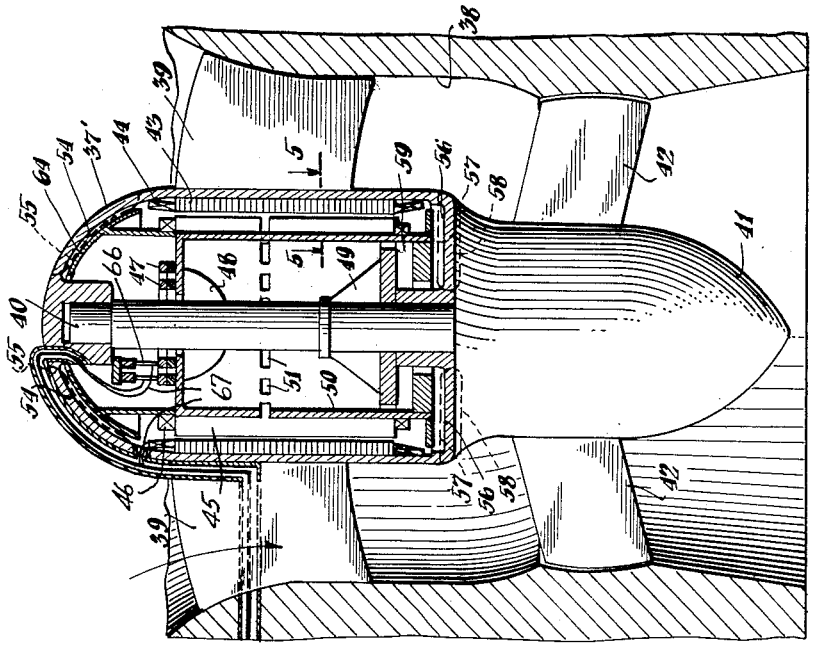
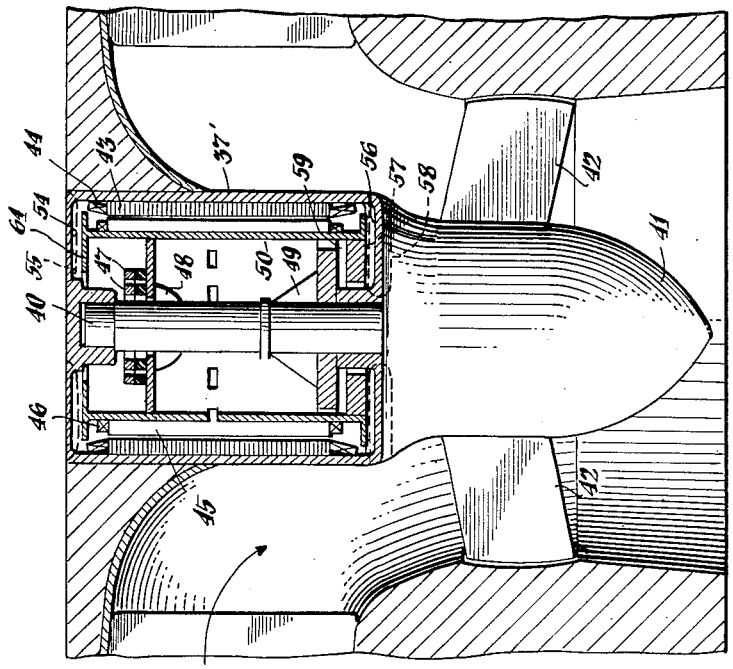
INVENTOR.
Jean-Claude Guimbal
BY
George H. Cordey
ATTORNEY April 7, 1953 J. C. GUIMBAL 2,634,375
COMBINED TURBINE AND GENERATOR UNIT
Filed Nov. 3, 1950 3 Sheets-Sheet 3
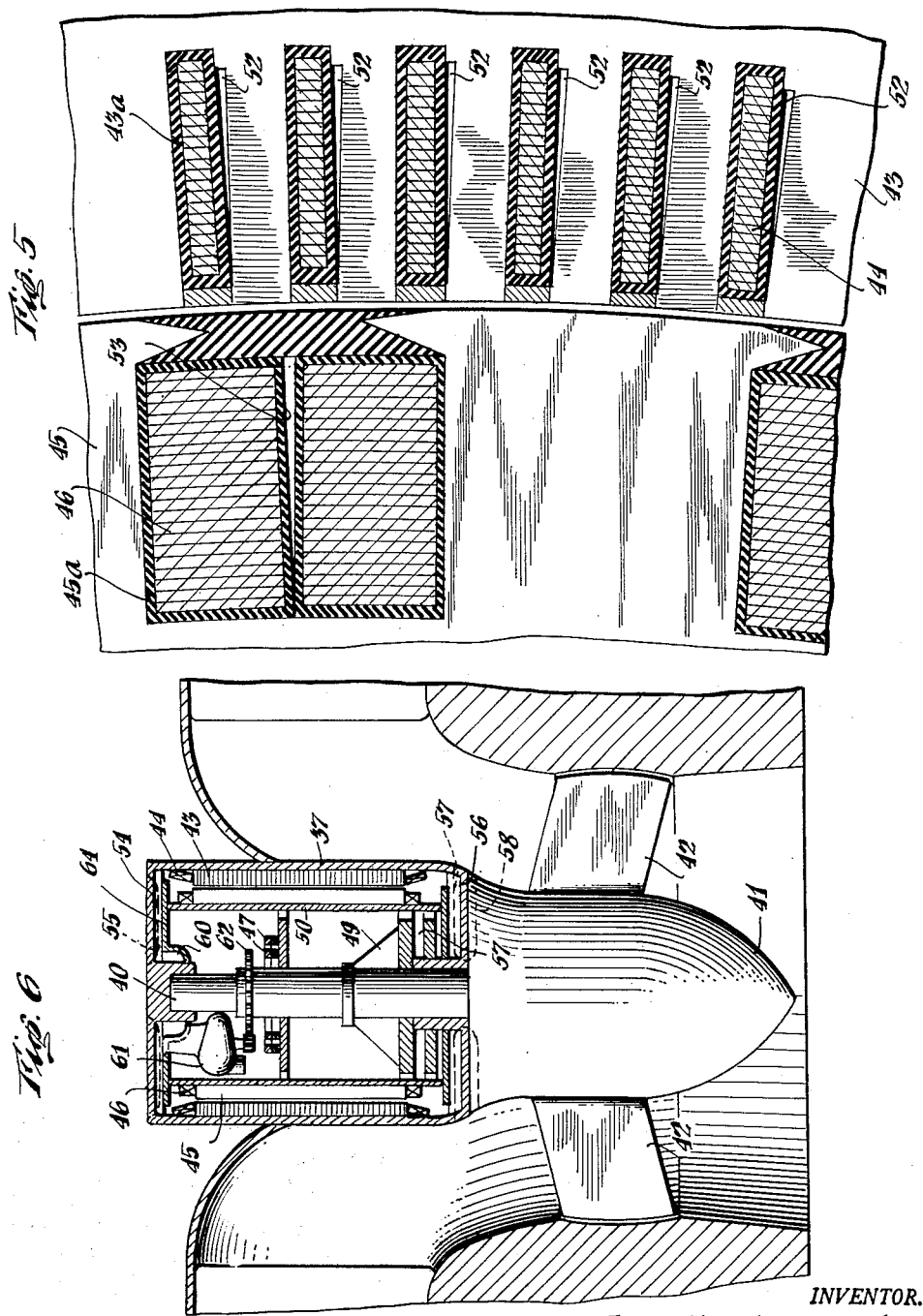
INVENTOR.
Jean-Claude Guimbal
BY
George H. Cosey
ATTORNEY Patented Apr. 7, 1953

2,634,375

UNITED STATES PATENT OFFICE 2,634,375

COMBINED TURBINE AND GENERATOR UNIT

Jean Claude Guimbal, Saint-Etienne, France

Application November 3, 1950, Serial No. 193,851
In France November 7, 1949

18 Claims. (Cl. 290—52)

The present invention relates to combined turbine and generator units for hydroelectric plants. It is especially useful in low and medium head plants.

In a unit constructed in accordance with the present invention the turbine and generator are built together as a single unit for installation under water. The unit is preferably constructed for installation at the throat of a convergent-divergent conduit which conveys water to and conducts it from the turbine unit.

An object of the invention is to provide a turbine and generator unit of the type described in which the space required is reduced to a minimum.

Another object is to provide, in a turbine unit of the type described, improved means for preventing leakage of water into the unit.

A further object of the invention is to provide, in a unit of the type described, improved apparatus for cooling and for lubricating the unit.

A further object is to construct a unit of the type described which may be installed with its principal shaft either horizontal, vertical or at any oblique angle.

The foregoing and other objects of the invention are attained by providing a unit in which the turbine or wheel or screw is connected directly to the rotor of the generator and the frame which supports the turbine wheel is connected directly to the stator of the generator. A housing is provided for enclosing the rotor and the stator of the generator, which housing may either be the hub of the turbine screw, or it may be a streamlined extension of the hub which forms a stationary part of the frame supporting the screw.

The casing which encloses the generator is filled with a fluid having a cooling capacity many times that of air at atmospheric pressure.

For example, this fluid can be compressed air or hydrogen, the pressure being then several atmospheres.

It can also be oil, in which case its pressure needs only to exceed slightly the pressure of water around the casing so as to prevent any leakage of water into it. The oil, thus filling the casing, can be used as a lubricant for the moving parts of the generator. On the other hand, when the fluid is a compressed gas, other means for lubricating the bearings of the unit must be secured. Many known means can be used for this purpose.

The fluid within the casing is circulated over the inside of the casing walls and over the windings of the generator. The casing walls act as heat exchangers to transfer heat from the fluid inside the casing to the water outside. The windings of the generator are thereby cooled.

Other advantages and objects of the invention will become apparent from a consideration of the following specification together with the accompanying drawings, in which:

Fig. 1 is a somewhat diagrammatic cross-sectional view of part of a power plant including a turbine and generator unit which is constructed in accordance with the present invention.

Fig. 2 is a cross-sectional view, on an enlarged scale, of the turbine and generator unit illustrated in Fig. 1.

Figs. 3 and 4 illustrate modified forms of turbine and generator units constructed in accordance with the present invention.

Fig. 5 is a detail cross-sectional view taken on the line 5—5 of Fig. 3, on an enlarged scale, showing part of the stator and rotor windings of a turbine and generator unit constructed in accordance with the present invention, illustrating especially the passages for cooling the windings by circulation of fluid over them.

Fig. 6 illustrates still another modification of a turbine and generator unit constructed in accordance with the invention.

Referring to Fig. 1, there is shown a hydroelectric power plant having a convergent intake conduit 1 leading to turbine and generator unit 2 which discharges through a divergent outlet conduit 3. The turbine and generator unit 2 is shown on an enlarged scale in Fig. 2. It includes an outer cylindrical casing 4 extending between two heavy end rings 5 and 6.

The ring 5 is provided with a number of radially inwardly extending arms 7 which support a false hub structure 8 at the center of the ring 5. The ring 6 is similarly provided with arms 9 and 10 extending radially inward and supporting at the center of the ring another false hub structure 11.

A shaft or arbor 12 is fixedly mounted in the false hubs 8 and 11. If desired, the shaft 12 may be constructed in several separable parts, as shown, to facilitate its assembly and disassembly. Between the false hubs 8 and 11, the shaft 12 rotatably supports a casing 13 on whose outer surface are mounted the blades 14 of the turbine screw. The casing 13 serves as a hub for the turbine screw, and its outer surface is contoured so that the false hub structures 8 and 11 form streamlined extensions of the casing 13.

The casing 13 carries on its inner surface the rotor of the generator. In the present instance, the rotor is the field and includes a field core 15 and a field winding 16.

The stator of the generator is mounted on the shaft 12 within the casing 13. In the present instance, the stator is the armature and includes a core 17 and windings 18 carried by a generally drum-shaped frame 19.

The casing 13 insulatingly supports inside one end thereof a pair of slip rings 20, which are insulated from the casing 13 proper and are electrically connected by means not shown to the field winding 16. These slip rings 20 cooperate with brushes 21 which are insulatingly carried by the frame 19 of the stator. Conductors 22 leading from the brushes 21 and from the stationary armature windings 18 are led through suitable openings in the shaft 12 to a cable 23 which extends through an axial passage 24 in the shaft and out through a radial passage 25 formed in the arm 10 associated with the end ring 6. The radial passage 25 is provided with an enclosing sheath or conduit 26. The cable 23 extends upwardly through the floor of the power plant 27, and its conductors are there connected to suitable switchgear 63 for connecting and disconnecting the generator from an electrical power network.

Within the floor of the power plant 27, the conduit 26 separates from the cable 23 and is connected within the power plant to a tank 28 partially filled with oil. The oil flows from the tank 28 through the conduit 26 and passages 25 and 24 to the interior of the casing 13. The casing 13 is thereby maintained full of oil under a pressure slightly greater than that of the water outside the casing 13. Casing 13 is mounted on the shaft 12 by means of bearings 29. The bearings 29 are lubricated by oil flowing from within the casing 13 through the bearings to the outside of the casing. Suitable seal rings 30 are provided between the casing and the shaft 12 to prevent undue leakage of oil through the bearings.

A pressure responsive safety device 31 is connected to the interior of tank 28. Upon any sudden increase in pressure in the generator casing 13, such as might be caused by a short circuit or other electrical failure, the safety device 31 will respond to disconnect the generator from the network.

The combined turbine and generator unit illustrated may be installed as a unit in a recess of convenient form provided in the concrete foundation which encloses the convergent-divergent inlet and outlet conduits. The unit may be maintained in place in any suitable manner.

Mounted between the outer ring 6 and the inner false hub structure 11 are a number of radial shafts 32, which carry vanes 33 for controlling the flow of water through the turbine. The vanes 33 are formed with extensions 33a which pass outwardly through arcuate slots 4a formed in the cylindrical casing 4 and concentric with the shafts 32. The extensions 33a terminate in balls 33b, which are received in suitable apertures in a control ring 34. The control ring 34 is slidable longitudinally along the outside of the casing 4 to control the angular position of the vanes 33 and thereby to control the flow of water through the turbine. The control ring 34 may be operated by a servomotor diagrammatically shown at 35 (see Fig. 1), which is in turn remotely controlled by an apparatus schematically indicated at 36.

The recess within which the turbine and generator unit 2 rests is enclosed by a cover 37 which may be removed for purposes of inspection or repair of the unit.

A gate 38 may be provided at the intake end of inlet conduit 1, so that the latter may be closed if it is desired to work on the turbine and generator unit. If necessary, a similar gate may be provided at the discharge end of the outlet conduit 3.

The oil which is supplied from tank 28 to the interior of the generator casing 13 is selected not only for its insulating and lubricating qualities, but also for its thermal capacity and ability to conduct heat rapidly. This oil is circulated within the casing 13 by suitable vanes 65 which are formed on the inside of the casing 13 and keep the oil therein in circulation over the parts of the generator and over the internal surfaces of the casing 13. The oil is heated by flowing over the windings of the generator, and the casing 13 then serves as a heat exchanger to transfer heat from the oil to the water outside the casing. Since the outside of the casing 13 is in direct contact with the water flowing through the turbine, it is continuously maintained in a relatively cool condition.

*Figures 3 and 5*

There is illustrated in Fig. 3 a modified form of combined turbine and generator unit. This modification includes a generator casing 37' which is fixedly mounted by means of arms 39 in the center of a water conduit 38. A shaft 40 is journaled centrally of the casing 37' and carries at its lower end a hub 41 which supports the turbine blades 42. This is an axial flow turbine unit. Although it is shown with its axis mounted vertically, it may equally well be mounted horizontally or at an oblique angle.

In this instance the armature is on the stator of the generator, and includes a core 43 and an armature winding 44. The field is on the rotor which turns with shaft 40, and includes a field core 45 and a field winding 46. Electrical connections are made with the field through slip rings 47 by means of brushes 66 and conductors 67 lead from the brushes and the armature windings 44 similarly to those of Fig. 2. The casing 37' is maintained filled with a suitable insulating, cooling and lubricating fluid, preferably oil, in a manner similar to the unit of Fig. 2. Circulation of the oil is promoted within the casing 37' by the centrifugal pumping action of vanes 48 attached to the shaft 40. The lateral strengthening wings 49, which are part of the framework also contribute to the centrifugal pumping action.

The drum-shaped frame 50 of the rotating field is provided with apertures 51 through which the oil can flow outwardly to the air gap between the armature and the field.

Slots 43a are formed in the armature core 43 to receive the armature windings 44, and are provided with recesses in their sides. When the windings 44 are in place in the slots, these recesses provide passages 52 (see Fig. 5) for the flow of cooling oil directly along the armature windings. In a similar manner, the winding slots 45a of the field cores 45 and the field windings 46 themselves are shaped so as to leave spaces 53 between the windings which form passages for cooling oil to flow lengthwise of the rotor. The passages 52 and 53 are, of course, open at their ends.

The inner surface of the upper end of casing 37' is provided with grooves 54 covered by means of a generally dome-shaped cover 64 so that oil expelled endwise through the passages 52 and 53 along the electrical windings is forced through the grooves 54. The outer surface of the upper end of casing 37' is provided with similar grooves 55, which are in heat exchange relationship with the internal grooves 54. These inner and outer grooves on the upper end of the casing 37' provide a heat exchanger for cooling the oil within the casing after it has been heated by flowing over the electrical windings. The outer surface of the upper end of casing 37' is directly in the stream of flowing water and is very effectively cooled thereby.

The lower end wall of casing 37' is provided with a similar heat exchange structure including inner grooves 56 and outer grooves 57. These outer grooves 57 lie adjacent the end of the turbine hub 41, and that hub is provided with a set of grooves 58 which cooperate with the grooves 57. Water enters grooves 58 from the grooves 57 and is expelled from grooves 58 by a centrifugal pumping action due to rotation of the hub. There is thus provided a continuous circulation through the grooves 57 and 58.

The oil flowing through the casing 37' is effective to cool not only the electrical windings but the plates 59 of the thrust bearing. At the same time, the oil is effective to lubricate the latter bearing.

*Figure 4*

The turbine and generator unit illustrated in this figure corresponds to that shown in Fig. 3, except that the turbine is of the Kaplan type, wherein the water flow enters radially and horizontally and is discharged vertically downward.

The several parts illustrated in this figure correspond functionally to those shown in Fig. 3 and have been given the same reference characters. The parts adjacent the upper end of the casing have been given the same reference characters as in Fig. 3 where they are functionally the same, even though the shape of the parts may be different to accommodate the different paths of water flow.

*Figure 6*

This figure illustrates a Kaplan type of turbine similar to that of Fig. 4, except that it is adapted to use hydrogen gas as the cooling and insulating fluid instead of oil. Those parts in Fig. 6 which correspond fully to the same parts in Fig. 5 have been given the same reference characters. The principal difference is in the cooling fluid circulation system, which includes a collector 60 delivering to the inlet of a blower 61, which is driven by a gear train 62 from the shaft 40. The gas is discharged axially by the blower 61 and cools the plates 59 of the thrust bearing. Lubrication of the bearings is provided by any suitable apparatus of conventional type (not shown). The cooling gas flows axially from the blower, through the radial passages at the lower end of the casing, axially again through the passages in the cores, and radially inward again through the passages at the upper end.

While it is preferred to use hydrogen on account of its well known superior cooling and insulating characteristics, any other gas of suitable characteristics may be used. The gas is maintained under pressure far greater than the water pressure by means not shown, so as to prevent leakage of water into the casing.

In units constructed in accordance with the invention, favorable hydraulic characteristics are secured by using a relatively small diameter of generator and a relatively low speed of rotation. Such characteristics are usually considered undesirable from an electrical standpoint, because in this case it is difficult to obtain a satisfactory cooling of the generator, when the unit supplies its nominal power output. However, the power output in these units may be increased by using current values greater than those normally permitted. Such current values are possible because of the favorable cooling characteristics of the units. These favorable characteristics are obtained because the casing is filled with a fluid having a high cooling capacity. The choice of this fluid is facilitated in that the low speed and small diameter permit the use of a liquid cooling fluid without undue friction losses.

The compactness and small over-all dimensions resulting from the low diameter of the generator, aside from securing satisfactory hydraulic flow conditions, make it possible to install a plurality of such sets at a comparatively small spacing between centers, which in turn greatly reduces the amount of civil engineering work involved in the hydraulic installation. Another advantageous consequence is the great facility in installation, mounting and maintenance.

The resulting generator is of unusual form, but is exactly suited to its position in the hydraulic flow through the turbine. Because of the small diameter of the generator rotor, the centrifugal forces developed are low, and the shaft of the generator is at no time subjected to dangerously high stresses. It may be constructed more cheaply than the usual generator shaft and be machined with high precision in its manufacture without being exposed to subsequent distortion in service by centrifugal action.

I claim:

1. A hydraulic turbine and generator unit for operation under water comprising a turbine, a generator stator element, a generator rotor element driven by said turbine, a casing enclosing said elements and connected to one of said elements, a shaft connected to the other of said elements, said shaft extending through said casing and journaled therein to permit relative rotation of the shaft and casing, an insulating fluid, having a cooling capacity far greater than that of air at atmospheric pressure, filling said casing, and means for maintaining said fluid under pressure greater than the pressure of water outside said casing to prevent leakage of water into said casing.

2. A hydraulic turbine and generator unit as defined in claim 1, in which said casing forms the hub of said turbine and rotates therewith, said rotor element being attached to the inside of the casing, and said shaft is stationary and supports said stator element.

3. A hydraulic turbine and generator unit comprising a turbine wheel having a hub, a generator rotor mounted inside said hub and rotating therewith, a fixed shaft rotatably supporting said hub, and a generator stator fixed on said shaft within said hub and cooperating with said rotor.

4. A hydraulic turbine and generator unit as defined in claim 1, in which said casing is fixed and supports said stator element, said turbine is mounted on said shaft outside said casing and said rotor element is mounted on said shaft inside said casing.

5. A hydraulic turbine and generator unit adapted to be mounted in a water conduit comprising a turbine screw, a hub for said screw, a first casing for said hub, a second casing forming a streamlined extension of said first casing, a stator element, a rotor element, one of said casings enclosing both said elements and connected to one of said elements, a shaft connected to the other of said elements, said shaft extending through said one casing and journaled therein to permit relative rotation of said shaft and casings, an insulating fluid, having a cooling capacity far greater than that of air at atmospheric pressure, filling said one casing, means for maintaining said fluid under pressure greater than the pressure of water outside said casing to prevent leakage of water into said casing, and means for supporting said casings centrally of a water conduit.

6. A hydraulic turbine and generator unit adapted to be mounted in a water conduit comprising a turbine screw, a hub for said screw, a first casing for said hub, a second casing forming a streamlined extension of said first casing, a stator element, a rotor element, one of said casings enclosing both said elements and connected to one of said elements, a shaft connected to the other of said elements, said shaft extending through said one casing and journaled therein to permit relative rotation of said shaft and casing, an insulating fluid, having a cooling capacity far greater than that of air at atmospheric pressure, filling said one casing, means for maintaining said fluid under pressure greater than the pressure of water outside said casing to prevent leakage of water into said casing, means for supporting said casings centrally of a water conduit, and distributor vanes pivotally mounted on said second casing and rotatable on axes extending generally radially of said conduit for controlling the flow of water therethrough.

7. A hydraulic turbine and generator unit adapted to be mounted in a water conduit comprising a turbine screw, a hub for said screw, a first casing for said hub, a second casing forming a streamlined extension of said first casing, a stator element, a rotor element, one of said casings enclosing both said elements and directly coupled to one of said elements, a shaft directly coupled to the other of said elements, said shaft extending through said one casing and journaled therein to permit relative rotation of said shaft and casing, an insulating fluid, having a cooling capacity far greater than that of air at atmospheric pressure, filling said one casing, means for maintaining said fluid under pressure greater than the pressure of water outside said casing to prevent leakage of water into said casing, and means for supporting said casings centrally of a water conduit.

8. A hydraulic turbine and generator unit adapted to be mounted in a water conduit comprising a turbine screw, a hub for said screw, a first casing for said hub, second and third casings forming streamlined extensions of said first casing, a stator element, a rotor element, said first casing enclosing both said elements and directly coupled to said rotor element, a shaft directly coupled to the stator, said shaft extending through said first casing and journaled therein to permit relative rotation of the first casing thereon, an insulating fluid, having a cooling capacity far greater than that of air at atmospheric pressure, filling said first casing, means for maintaining said fluid under pressure greater than the pressure of water outside said casing to prevent leakage of water into said casing, and means for supporting said second and third casings centrally of a water conduit.

9. A hydraulic turbine and generator unit adapted to be mounted in a water conduit comprising a turbine screw, a hub for said screw, a first casing for said hub, a second casing forming a streamlined extension of said first casing, a stator element, a rotor element, said second casing enclosing both said elements and directly coupled to said stator element, a shaft directly coupled to the rotor element, said shaft extending through said second casing and journaled therein for rotation relative thereto, said shaft carrying said hub outside said second casing, an insulating fluid, having a cooling capacity far greater than that of air at atmospheric pressure, filling said second casing, means for maintaining said fluid under pressure greater than the pressure of water outside said second casing to prevent leakage of water into said casing, and means for supporting said second casing centrally of a water conduit.

10. A hydraulic turbine and generator unit adapted to be mounted in a water conduit comprising a turbine screw, a hub for said screw, a first casing for said hub, a second casing forming a streamlined extension of said first casing, a stator element, a rotor element, one of said casings enclosing both said elements and connected to one of said elements, a shaft connected to the other element, said shaft extending through said one casing and journaled therein to permit relative rotation of said shaft and said one casing, means for supporting said casings centrally of a water conduit, and distributor vanes pivotally mounted on said second casing and rotatable on axes extending generally radially of said conduit for controlling the flow of water therethrough.

11. A hydraulic turbine and generator unit for operation under water comprising a generator stator element, a generator rotor element, electric windings on said elements, a casing enclosing said elements and connected to one of said elements, a shaft connected to the other of said elements, said shaft extending through said casing and journaled therein to permit relative rotation of the shaft and casing, means for supporting said casing in the path of a stream of water, heat exchange means on said casing cooled by water flowing past said casing, a turbine fixed to said rotor element so that the turbine and rotor element are rotated by water flowing past said casing, and electrically insulating fluid filling said casing, said fluid having a cooling capacity at least substantially greater than that of air or atmospheric pressure, and means operated by rotation of said rotor to circulate said fluid over said windings and said heat exchange means so as to cool said windings.

12. A hydraulic turbine and generator unit as defined in claim 11, in which said heat exchange means comprises grooves formed on the outside of said casing for receiving water and grooves formed on the inside of said casing adjacent said outside grooves for receiving said insulating fluid.

13. A hydraulic turbine and generator unit as defined in claim 11, including bearing means between said shaft and said casing, and in which said fluid is a lubricating fluid and is circulated over said bearing means for lubrication purposes.

14. A hydraulic turbine and generator unit as defined in claim 11, including means maintaining said fluid under a pressure greater than the pressure of water outside said casing to prevent leakage of water into said casing.

15. A hydraulic turbine and generator unit as defined in claim 11, in which said supporting means has a passage therethrough opening at one end into said casing, and including means for supplying make-up fluid to said casing through said passage, and means maintaining the fluid in said passage and casing under pressure greater than the pressure of water outside said casing to prevent leakage of water into said casing.

16. A hydraulic turbine and generator unit as defined in claim 15, including electric connections for said windings extending through said passage.

17. A hydraulic turbine and generator unit for operation under water comprising a generator stator element, a generator rotor element, electric windings on said elements, a casing enclosing said elements and attached to said stator element, a shaft attached to the rotor element, said shaft extending through said casing and journaled therein for rotation relative thereto, means for supporting said casing in the path of a stream of water, heat exchange means on said casing adjacent said shaft, a turbine fixed on the shaft outside the casing so that the turbine and shaft are rotated by water flowing past the casing, fluid moving means fixed on said shaft outside said casing and adjacent said heat exchange means and effective upon rotation of the shaft to produce a flow of water over said heat exchange means, an electrically insulating fluid filling said casing, said fluid having a cooling capacity at least substantially greater than that of air at atmospheric pressure, means maintaining said fluid under pressure greater than the pressure of water outside said casing to prevent leakage of water into said casing, and means on said rotor and effective upon rotation thereof to circulate said fluid within said casing over said windings and said heat exchange means so as to cool said windings.

18. A hydraulic turbine and generator unit for operation under water comprising a generator stator element, a generator rotor element, a casing enclosing said elements and attached to said rotor element, a shaft attached to the stator element, said shaft being fixed and extending through said casing and journaled therein to permit rotation of the casing on the shaft, means for supporting said shaft and casing in the path of a stream of water, an electrically insulating fluid filling said casing, said fluid having a cooling capacity far greater than that of air at atmospheric pressure, turbine blades attached to the periphery of the casing and extending radially outward therefrom, said turbine and casing being rotated by water flowing past the casing and said casing being cooled by said water, said supporting means and said shaft having communicating passages therethrough opening within said casing, means supplying make-up fluid to said casing through said passages, and means maintaining the fluid in said passages and casing under pressure greater than the pressure of water outside said casing to prevent leakage of water into said casing.

JEAN CLAUDE GUIMBAL.

REFERENCES CITED

The following references are of record in the file of this patent:

UNITED STATES PATENTS

| Number | Name | Date |
|---|---|---|
| 797,058 | Hedlund | Aug. 15, 1905 |
| 840,040 | Callan | Jan. 1, 1907 |
| 1,443,644 | Nobuhara | Jan. 30, 1923 |
| 1,448,700 | Seidner | Mar. 13, 1923 |
| 1,531,724 | Arutunoff | Mar. 31, 1925 |
| 1,584,383 | Le Blanc | May 11, 1926 |
| 2,084,479 | Coberly | June 22, 1937 |
| 2,270,141 | Potter | Jan. 13, 1942 |
| 2,299,406 | Potter | Oct. 20, 1942 |
| 2,436,683 | Wood, Jr. | Feb. 24, 1948 |
| 2,495,745 | Litton | Jan. 31, 1950 |

FOREIGN PATENTS

| Number | Country | Date |
|---|---|---|
| 99,887 | Sweden | Sept. 24, 1940 |
| 204,123 | Great Britain | Sept. 21, 1923 |